United States Patent
Chen et al.

(10) Patent No.: US 10,168,205 B2
(45) Date of Patent: Jan. 1, 2019

(54) OPTICAL SENSING MODULE AND ELECTRONIC APPARATUS

(71) Applicant: PIXART IMAGING INC., Hsin-Chu County (TW)

(72) Inventors: Hui-Hsuan Chen, Hsin-Chu County (TW); Jia-Hong Huang, Hsin-Chu County (TW); Tien-Chia Liu, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 49 days.

(21) Appl. No.: 14/274,855

(22) Filed: May 12, 2014

(65) Prior Publication Data

US 2015/0008329 A1    Jan. 8, 2015

(30) Foreign Application Priority Data

Jul. 5, 2013   (TW) .............................. 102124340 A

(51) Int. Cl.
 *G01J 1/04* (2006.01)
 *G01J 1/42* (2006.01)
 *G01J 1/02* (2006.01)

(52) U.S. Cl.
CPC ........... *G01J 1/0411* (2013.01); *G01J 1/0242* (2013.01); *G01J 1/0437* (2013.01); *G01J 1/0477* (2013.01); *G01J 1/42* (2013.01)

(58) Field of Classification Search
CPC .... G01J 3/02; G01J 3/0208; G01J 3/04; G01J 3/2823; G01J 1/0411; G01J 1/0477; G01J 1/42; G01J 1/0242; G01J 1/0437

USPC ......................................................... 250/393
See application file for complete search history.

(56) References Cited

U.S. PATENT DOCUMENTS

| | | | | |
|---|---|---|---|---|
| 5,512,997 A * | 4/1996 | Ogawa | ................... | G01C 3/085 356/3.04 |
| 5,559,639 A * | 9/1996 | Nakagishi | .......... | G02B 26/0883 359/813 |
| 6,862,147 B1 * | 3/2005 | Sonstroem | ............. | G02B 23/12 359/619 |
| 7,385,710 B1 * | 6/2008 | Sturgill | ................... | G01B 11/06 356/632 |
| 8,279,178 B2 * | 10/2012 | Krishnan | ............ | G06F 3/03543 178/18.09 |

(Continued)

FOREIGN PATENT DOCUMENTS

| CN | 1783950 A | 6/2006 |
|---|---|---|
| CN | 102129163 A | 7/2011 |

(Continued)

*Primary Examiner* — Taeho Jo
(74) *Attorney, Agent, or Firm* — Hauptman Ham, LLP

(57) ABSTRACT

An optical sensing module including a lens and a sensing device is provided. The lens has an optical axis. The sensing device is disposed under the lens, wherein the sensing device is to receive an object beam passing the lens. The optical axis of the lens deviates from a geometric center of the sensing device. An optical sensing module including a prism film, a sensing device and a lens is further provided. The prism film has a plurality of prisms. The sensing device is disposed under the prism film, wherein the sensing device is to receive an object beam sequentially passing the prism film and the lens. The lens is disposed between the prism film and the sensing device.

13 Claims, 5 Drawing Sheets

(56) References Cited

U.S. PATENT DOCUMENTS

| | | | | |
|---|---|---|---|---|
| 9,784,838 B1* | 10/2017 | Shpunt | | G01S 17/89 |
| 2005/0236553 A1* | 10/2005 | Noto | | H01L 27/14621 |
| | | | | 250/208.1 |
| 2007/0007439 A1* | 1/2007 | Nuebling | | F21V 5/04 |
| | | | | 250/216 |
| 2007/0126898 A1* | 6/2007 | Feldman | | G02B 9/12 |
| | | | | 348/294 |
| 2007/0164111 A1* | 7/2007 | Wang | | G06K 7/10544 |
| | | | | 235/454 |
| 2007/0222916 A1* | 9/2007 | Kohara | | G02B 5/045 |
| | | | | 349/65 |
| 2008/0116379 A1* | 5/2008 | Teder | | B60S 1/0822 |
| | | | | 250/341.1 |
| 2008/0137071 A1* | 6/2008 | Chow | | G01B 11/026 |
| | | | | 356/73 |
| 2010/0183200 A1* | 7/2010 | Wu | | G06K 9/00046 |
| | | | | 382/127 |
| 2010/0278480 A1* | 11/2010 | Vasylyev | | G02B 3/005 |
| | | | | 385/33 |
| 2010/0295773 A1* | 11/2010 | Alameh | | H03K 17/9631 |
| | | | | 345/156 |
| 2010/0295781 A1* | 11/2010 | Alameh | | G06F 3/017 |
| | | | | 345/158 |
| 2011/0128220 A1* | 6/2011 | Bynum | | G06F 3/0317 |
| | | | | 345/157 |
| 2011/0221599 A1* | 9/2011 | Hogasten | | H01L 27/14609 |
| | | | | 340/632 |
| 2011/0317150 A1* | 12/2011 | Decoux | | G06K 7/10722 |
| | | | | 356/73 |
| 2012/0132788 A1* | 5/2012 | Findlay | | G01J 1/0219 |
| | | | | 250/208.2 |
| 2012/0133956 A1* | 5/2012 | Findlay | | H03K 17/941 |
| | | | | 356/614 |
| 2012/0261474 A1* | 10/2012 | Kawashinne | | G02B 3/14 |
| | | | | 235/462.24 |
| 2013/0075595 A1* | 3/2013 | Ruh | | G01S 17/026 |
| | | | | 250/221 |
| 2013/0153755 A1* | 6/2013 | Pikkujamsa | | G01V 8/12 |
| | | | | 250/221 |
| 2013/0153772 A1* | 6/2013 | Rossi | | G01S 17/026 |
| | | | | 250/353 |
| 2013/0284908 A1* | 10/2013 | Rossi | | G01S 17/026 |
| | | | | 250/221 |
| 2014/0061308 A1* | 3/2014 | Madej | | G07G 1/0018 |
| | | | | 235/440 |
| 2014/0072003 A1* | 3/2014 | Matsumoto | | B23K 26/0648 |
| | | | | 372/26 |
| 2014/0130855 A1* | 5/2014 | Gu | | H01L 31/0524 |
| | | | | 136/255 |
| 2014/0252213 A1* | 9/2014 | Ruh | | H01L 31/125 |
| | | | | 250/227.11 |

FOREIGN PATENT DOCUMENTS

| | | |
|---|---|---|
| JP | 2008-54030 A | 3/2008 |
| TW | 419610 | 1/2001 |
| TW | M448798 | 3/2013 |

* cited by examiner

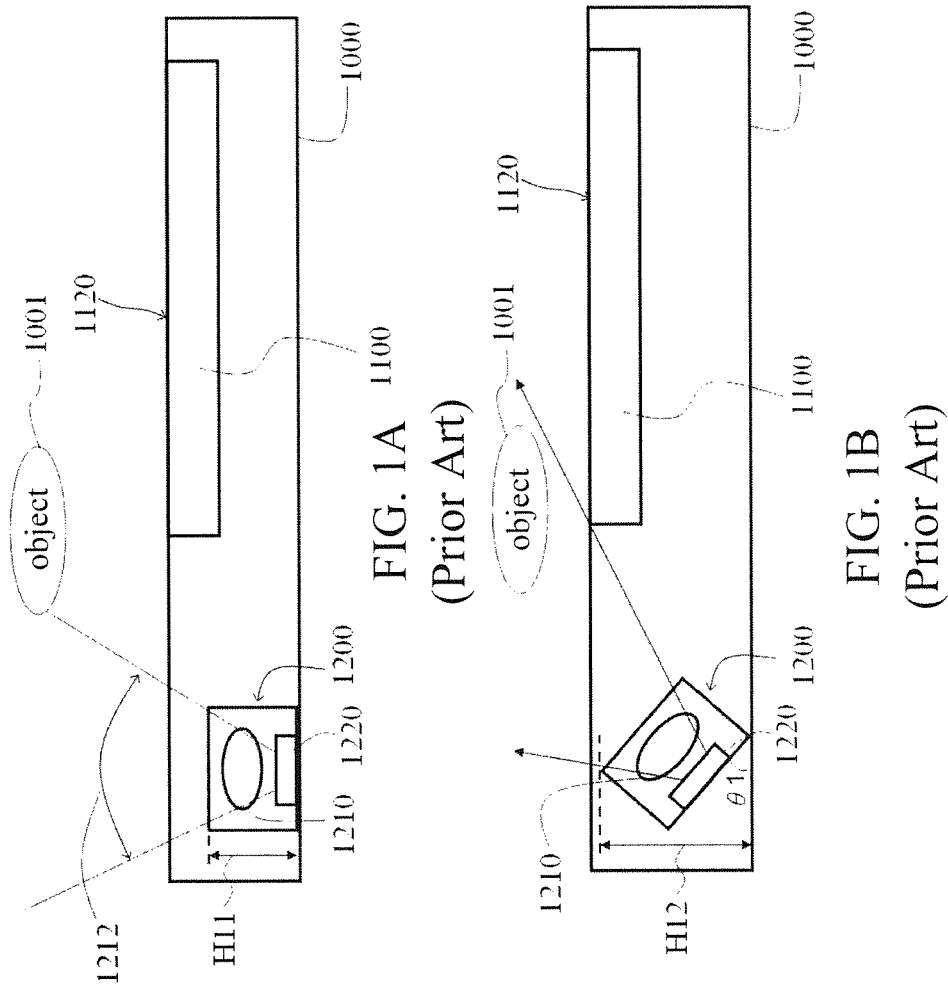

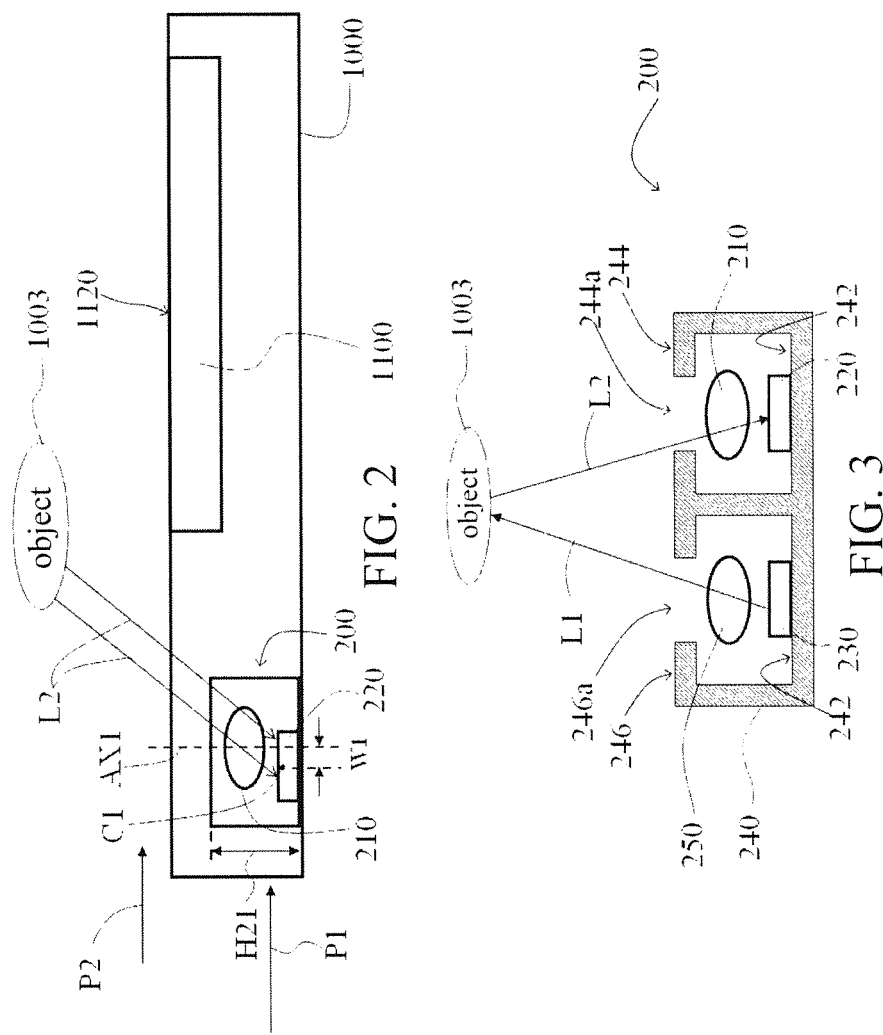

OPTICAL SENSING MODULE AND ELECTRONIC APPARATUS

CROSS REFERENCE TO RELATED APPLICATION

The present application is based on and claims priority to Taiwanese Application Number 102124340, filed Jul. 5, 2013, the disclosure of which is hereby incorporated by reference herein in its entirety.

BACKGROUND

1. Field of the Disclosure

This disclosure generally relates to a sensing module and an electronic apparatus and, more particularly, to an optical sensing module and an electronic apparatus.

2. Description of the Related Art

FIG. 1A shows a cross-sectional view of the traditional electronic apparatus using a conventional optical sensing module to perform the object detection. Referring to FIG. 1A, the conventional electronic apparatus 1000 includes a display device 1100 and an optical sensing module 1200. The display device 1100 has a display surface 1120, wherein the display surface is configured to show images to be displayed. The optical sensing module 1200 includes a lens 1210 and an image sensing device 1220. Generally speaking, the optical sensing module 1200 has a sensing range 1212 through the use of the lens 1210. That is, when an object 1001 enters the sensing range 1212, it can be imaged onto the image sensing device 1220 through the lens 1210. In this manner, the optical sensing module 1200 can perform the identification, such as the gesture recognition, according to the images captured by the image sensing device 1220.

For current hand-held electronic apparatuses 1000 (e.g. the cell phone or tablet computer), the optical sensing module 1200 is generally disposed at the upper peripheral of the display device 1100. The term "upper peripheral" herein is referred to the upper side of the display surface 1120 when the user holds the hand-held electronic apparatus 1000 correctly, e.g. the front camera being disposed at the upper side of the display surface for current smart phones.

However, when the optical sensing module 1200 is used to detect the hand motion, the user generally waves his/her hand right in front of the display surface 1120 due to his/her habit of hand waving. Accordingly, if it is desired to improve the effective sensing range of the optical sensing module 1200, the optical sensing module 1200 needs to be tilted by an angle θ1 such that the original sensing range 1212 may be as close to the front of the display surface 1120 as possible, as shown in FIG. 1B. Although this is possible to improve the detection of the hand waving motion of the user in front of the display surface 1120 by the optical sensing module 1200, as the optical sensing module 1200 has to be tilted so that the thickness H12 required by the optical sensing device 1200 inside the electronic apparatus 1000 is increased, the original thickness H11 is increased to H12 as shown in FIGS. 1A and 1B. In other words, it is not possible to effectively reduce the total thickness of the electronic apparatus 1000 by using this kind of design.

SUMMARY

The present disclosure provides an optical sensing module that may effectively detect an object in a lateral direction through proper optical design.

The present disclosure further provides an electronic apparatus that incorporates the aforementioned optical sensing module thereby effectively improving the detection of the object in front of a display surface and maintaining a thin total thickness.

One embodiment of the present disclosure provides an optical sensing module including a first lens and a sensing device. The first lens has an optical axis. The sensing device is disposed under the first lens, wherein the sensing device is adapted to receive an object beam passing through the first lens. The optical axis of the first lens does not pass through a geometric center of the sensing device.

In one aspect of the present disclosure, a shortest distance W1 between the optical axis of the first lens and the geometric center of the sensing device is substantially between 0.2 mm and 0.4 mm.

In one aspect of the present disclosure, the optical sensing module further includes a light source, wherein the light source is adapted to provide a radiation beam emergent from the optical sensing module. When the radiation beam transmits to an object, the object is adapted to reflect the radiation beam to become the object beam.

In one aspect of the present disclosure, the optical sensing module further includes a housing, wherein the housing has a bottom surface and a light incident surface opposite to the bottom surface. The sensing device and the first lens are inside the housing, and the sensing device is disposed on the bottom surface. The first lens is between the sensing device and the light incident surface. In one aspect of the present disclosure, the light incident surface has a light incident hole. In one aspect of the present disclosure, the optical sensing module further includes a light source, wherein the light source is disposed inside the housing and adapted to provide a radiation beam emergent from the optical sensing module. When the radiation beam transmits to an object, the object is adapted to reflect the radiation beam to become the object beam.

In one aspect of the present disclosure, the optical sensing module further includes a prism film which includes a plurality of prisms, wherein the radiation beam from the light source is adapted to sequentially pass through a second lens and the prism film and emerge from the optical sensing module, and the second lens is between the prism film and the light source.

In one aspect of the present disclosure, the optical sensing module further includes a second lens having an optical axis and disposed above the light source, and the optical axis of the second lens does not pass through a geometric center of the light source, and the radiation beam from the light source is adapted to pass through the second lens and emerge from the optical sensing module.

In one aspect of the present disclosure, the housing further has a light emergent surface opposite to the bottom surface and adjacent to the light incident surface. The radiation beam is adapted to emerge from the optical sensing module via the light emergent surface. In one aspect of the present disclosure, the light emergent surface has a light emergent hole.

In one aspect of the present disclosure, the lens has a light incident plane, a light emergent plane opposite to the light incident plane and at least one connecting plane, and the connecting plane connects the light incident plane and the light emergent plane.

Another embodiment of the present disclosure further provides an optical sensing module including a first prism film, a sensing device and a first lens. The first prism film has a plurality of first prisms. The sensing device is disposed under the prism film, wherein the sensing device is adapted to receive an object beam passing through the prism film and the first lens in order. The first lens is disposed between the first prism film and the sensing device.

In one aspect of the present disclosure, an angle of each of the first prisms is substantially between 20 degrees and 43 degrees. In one aspect of the present disclosure, an angle of each of the first prisms is substantially between 32 degrees and 34 degrees.

In one aspect of the present disclosure, the optical sensing module further includes a light source, wherein the light source is adapted to provide a radiation beam emergent from the optical sensing module. When the radiation beam transmits to an object, the object is adapted to reflect the radiation beam to become the object beam.

In one aspect of the present disclosure, the optical sensing module further includes a housing, wherein the housing has a bottom surface and a light incident surface opposite to the bottom surface. The sensing device and the first lens are inside the housing, and the sensing device is disposed on the bottom surface. The first lens is between the sensing device and the light incident surface. In one aspect of the present disclosure, the light incident surface has a light incident hole. In one aspect of the present disclosure, the optical sensing module further includes a light source, wherein the light source is disposed inside the housing and adapted to provide a radiation beam emergent from the optical sensing module, wherein when the radiation beam transmits to an object, the object is adapted to reflect the radiation beam to become the object beam.

In one aspect of the present disclosure, the optical sensing module further includes a second prism film which includes a plurality of second prisms, wherein the radiation beam from the light source is adapted to sequentially pass through a second lens and the second prism film and emerge from the optical sensing module, and the second lens is between the second prism film and the light source.

In one aspect of the present disclosure, the optical sensing module further includes a second lens having an optical axis and disposed above the light source, and the optical axis of the second lens does not pass through a geometric center of the light source, and the radiation beam from the light source is adapted to pass through the second lens and emerge from the optical sensing module.

In one aspect of the present disclosure, the housing further has a light emergent surface opposite to the bottom surface and adjacent to the light incident surface. The radiation beam is adapted to emerge from the optical sensing module via the light emergent surface. In one aspect of the present disclosure, the light emergent surface has a light emergent hole.

The present disclosure further provides an electronic apparatus including a display device and an optical sensing module. The display device has a display surface. The optical sensing module has a light emergent surface and a light incident surface located at a peripheral of the display surface. The optical sensing module is the optical sensing module mentioned above.

The optical sensing module according to one embodiment of the present disclosure may change a sensing range of the optical sensing module by deviating the lens such that the optical sensing module may still have a better sensing performance without increasing the thickness of an electronic apparatus when being applied to the electronic apparatus. In addition, the sensing range of the optical sensing module may be changed by the optical design of the prism film such that the optical sensing module may have a better sensing performance without increasing the thickness of an electronic apparatus when being applied to the electronic apparatus.

BRIEF DESCRIPTION OF THE DRAWINGS

Other objects, advantages, and novel features of the present disclosure will become more apparent from the following detailed description when taken in conjunction with the accompanying drawings.

FIG. 1A shows a cross-sectional view of the traditional electronic apparatus using a conventional optical sensing module to perform the object detection.

FIG. 1B shows a cross-sectional view of the electronic apparatus of FIG. 1A in which the optical sensing module performs the object detection with a tilted angle.

FIG. 2 shows a cross-sectional view of the optical sensing module applied to an electronic apparatus according to an embodiment of the present disclosure.

FIG. 3 shows a partial perspective view along the direction P1 in FIG. 2.

DETAILED DESCRIPTION OF THE EMBODIMENT

Figure 4:
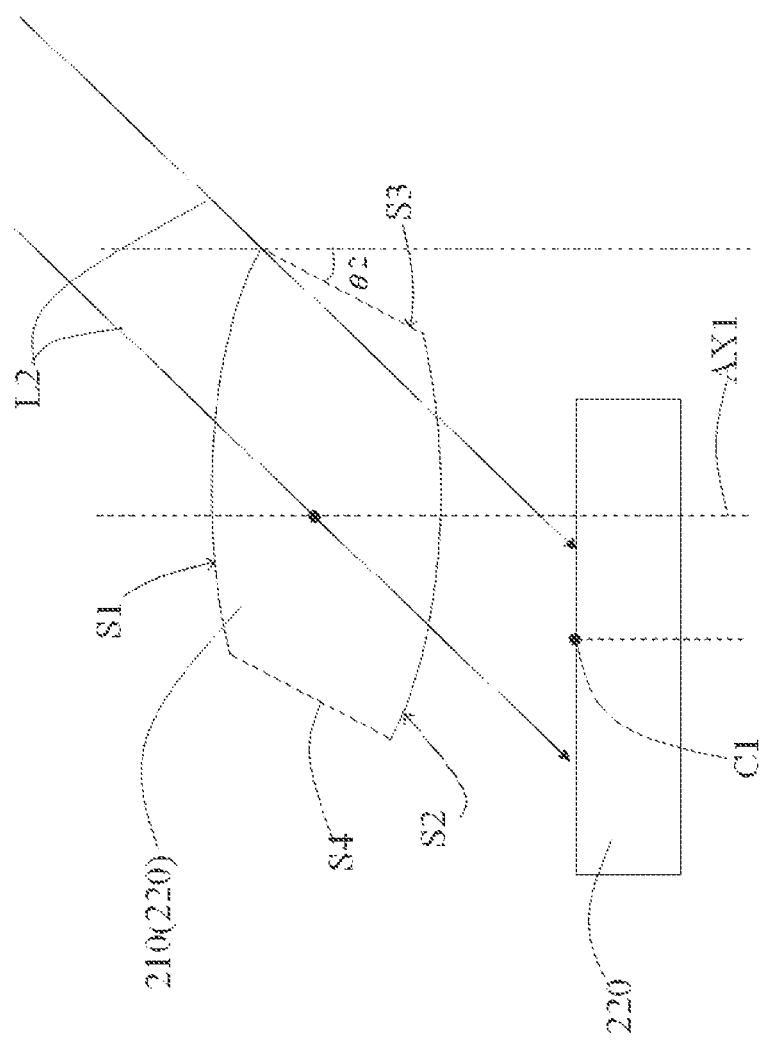
FIG. 4 shows a schematic diagram of another embodiment of the first lens and the second lens of FIG. 2.

FIG. 2 shows a cross-sectional view of the optical sensing module applied to an electronic apparatus according to an embodiment of the present disclosure. FIG. 3 shows a partial perspective view along the direction P1 in FIG. 2. For illustration purpose, FIG. 3 does not show the electronic apparatus and the display device of FIG. 2. Referring to FIGS. 2 and 3 together, the optical sensing module 200 of this embodiment includes a first lens 210 and a sensing device 220. The first lens 210 has an optical axis AX1. In this embodiment, the first lens 210 may be a spherical lens or non-spherical lens, wherein a spherical lens is taken as an example in this embodiment, but not limited thereto.

The sensing device 220 is disposed under the first lens 120, wherein the sensing device 220 is adapted to receive an object beam L2 passing through the first lens 210, as shown in FIGS. 2 and 3. In this embodiment, the sensing device 220 may be implemented by the complementary metal-oxide-semiconductor (CMOS) image sensor or charge-coupled device (CCD) image sensor, wherein a CMOS image sensor is taken as an example in this embodiment, but not limited thereto. Specifically speaking, the optical sensing module 200 of this embodiment may include a light source 230, wherein the light source 230 is adapted to provide a radiation beam L1 emergent from the optical sensing module 200. In this manner, when the radiation beam L1 transmits to an object 1003, the object 1003 is adapted to reflect the radiation beam L1 to become the object beam L2. In this embodiment, the object 1003 is exemplarily illustrated by the user's hand or other hand-held objects, but not limited thereto. In addition, the light source 230 may be implemented by invisible light sources, e.g. the infrared light source or UV light source, wherein an infrared light source is taken as an example herein, but not limited thereto. It should be mentioned that in order to be able to detect the object beam L2, the sensing device 220 may select the image sensor for sensing invisible light, e.g. the infrared image sensor.

Referring to FIGS. 2 and 3 continuously, the optical axis AX1 of the first lens 210 does not pass through a geometric center C1 of the sensing device 220. Specifically speaking, for general prior art optical design, the optical axis AX1 of the first lens 210 is aligned with the geometric center C1 of the sensing device 220 such that the image imaging on the sensing device can have a better imaging quality and symmetry, wherein the geometric center C1 of the sensing device 220 herein is referred to a geometric center of the pixel matrix. However, in order to overcome the problem mentioned in the prior art, the optical axis AX1 of the first lens 210 in the optical sensing module 200 of this embodiment is deviated from the geometric center C1 of the sensing device 220 such that the object beam L2 received by the first lens 210 may be closer to the range in front of a display surface 1120 of the display device 1100 of an electronic apparatus 1000. In other words, the sensing range of the optical sensing module 200 may be closer to the right direction, as shown in FIG. 2, than that of the optical sensing module 1200, as shown in FIG. 1. In this manner, a better sensing performance may be achieved without increasing the thickness H21 of the optical sensing module 200 (i.e. the thickness H21 may be identical or similar to the thickness H11) when the user generally performs the hand waving in front of the display surface 1120. In order to achieve a better sensing quality and keep the length of the optical sensing module 200 along the horizontal direction P2, the shortest distance W1 between the optical axis AX1 of the first lens 210 and the geometric center C1 of the sensing device 220 may be substantially between 0.2 mm and 0.4 mm.

In addition, the optical sensing module 200 may include a housing 240, wherein the housing 240 has a bottom surface 242 and a light incident surface 244 opposite to the bottom surface 242, as shown in FIG. 3. In this embodiment, the sensing device 220 and the first lens 210 are located inside the housing 240, and the sensing device 220 is disposed on the bottom surface 242. The first lens 210 is located between the sensing device 220 and the light incident surface 244, wherein the light incident surface 244 may have a light incident hole 244a for receiving the object beam L2 reflected by the object 1003.

In this embodiment, the aforementioned light source 230 may also be disposed inside the housing 240 and on the bottom surface 242, wherein the housing 240 may have a light emergent surface 246 opposite to the bottom surface 242 and adjacent to the light incident surface 244 such that the radiation beam L1 provided by the light source 230 may emerge from the optical sensing module 200 via the light emergent hole 246a of the light emergent surface 246. In addition, due to the optical design of the optical sensing module 200 mentioned above, the sensing range of the optical sensing module 200 may be closer to the right direction, as shown in FIG. 2, than that of the optical sensing module 1200, as shown in FIG. 1. In order to allow the radiation beam L1 to also illuminate the same sensing range, the optical sensing module 200 of this embodiment may further include a second lens 250, wherein the second lens 250 has an optical axis AX2 and is disposed above the light source 230. Similarly, the optical axis AX2 of the second lens 250 does not pass through a geometric center of the light source 230, wherein the geometric center of the light source 230 is referred to a geometric center of the light emitting diode. In this manner, when the radiation beam L1 from the light source 230 passes through the second lens 250 and emerges from the optical sensing module 200, the radiation beam L1 may be closer to the range in front of the display surface or the right direction of FIG. 2 as the sensing range mentioned above.

In another embodiment, in order to further save the total area of the optical sensing module 200 along the horizontal direction P2 and not to affect the sensing quality, unnecessary part of the first lens 210 and the second lens 250 may be removed so as to further reduce the total area of the optical sensing module 200 in the horizontal direction P2. Specifically speaking, the first lens 210 and the second lens 250 may respectively haven light incident plane S1, a light emergent plane S2 opposite to the light incident plane S1 and at least one connecting plane S3, wherein the connecting plane S3 is configured to connect the light incident plane S1 and the light emergent plane S2. In this embodiment, the connecting plane S3 may be a cutting surface. In addition, in order to achieve a better imaging quality and have a smaller area along the horizontal direction P2, the included angle θ2 between the connecting plane S3 and the optical axis is substantially larger than 0 degree and smaller than or equal to 75 degrees, as shown in FIG. 4.

Figure 5:
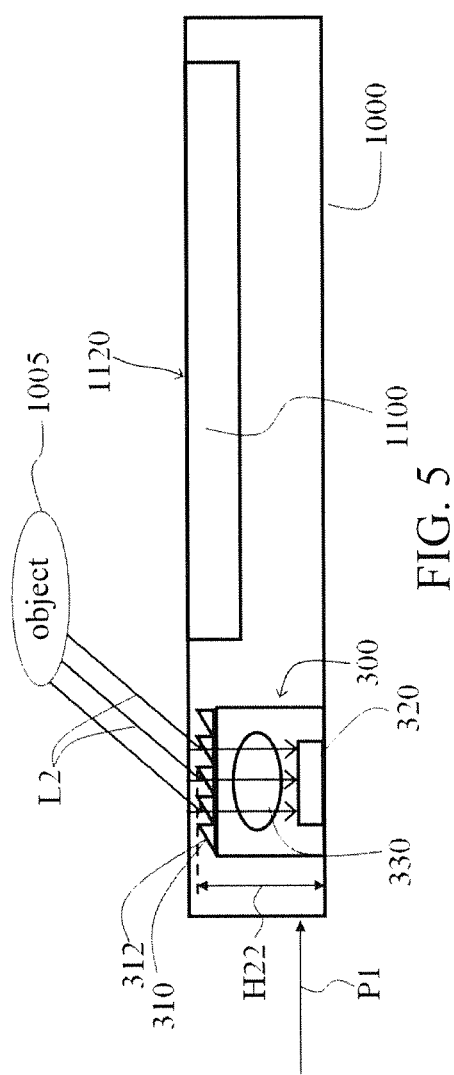
FIG. 5 shows a cross-sectional view of the optical sensing module applied to an electronic apparatus according to an embodiment of the present disclosure.
Figure 6:
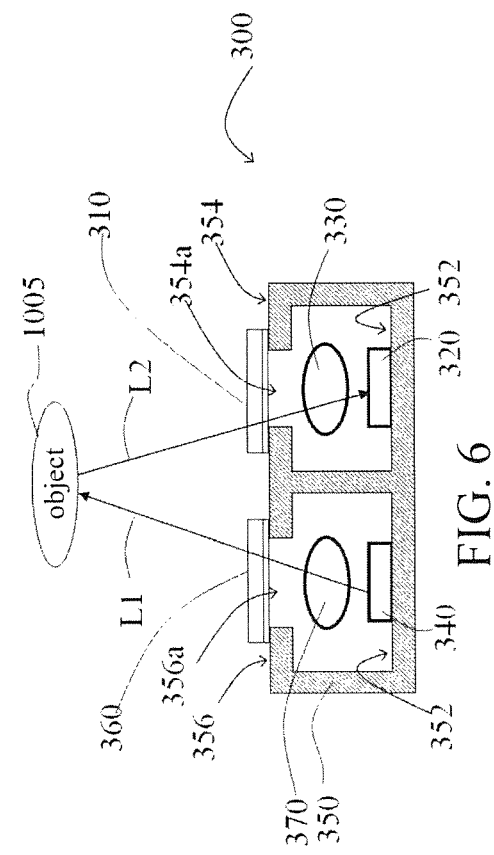
FIG. 6 shows a partial perspective view along the direction P1 in FIG. 5.
Figure 7:
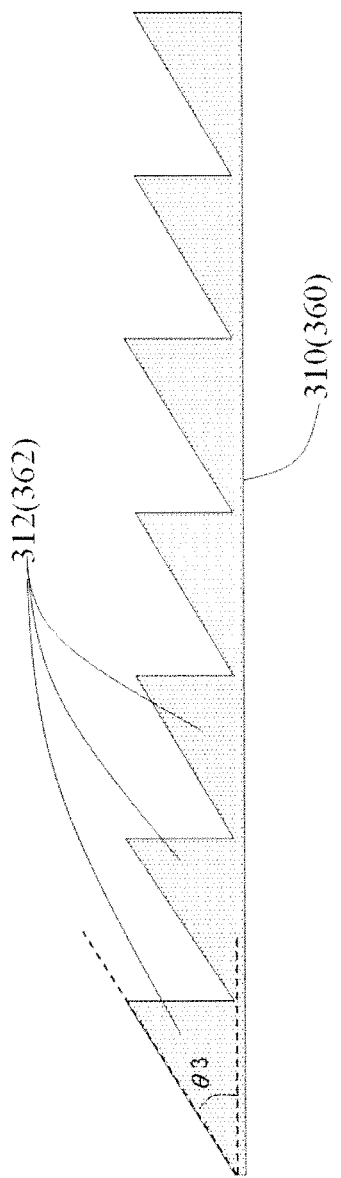
FIG. 7 shows a partially enlarged view of the prism film used in FIGS. 5 and 6.

FIG. 5 shows a cross-sectional view of the optical sensing module applied to an electronic apparatus according to an embodiment of the present disclosure. FIG. 6 shows a partial perspective view along the direction P1 in FIG. 5. FIG. 7 shows a partially enlarged view of the prism film used in FIGS. 5 and 6. For illustration purpose, FIG. 6 does not show the electronic apparatus and display device of FIG. 5. Referring to FIGS. 5 and 6 together, the optical sensing module 300 of this embodiment includes a first prism film 310, a sensing device 320 and a first lens 330. The first prism film 310 has a plurality of first prisms 312. In this embodiment, the first prisms 312 may be prism stripes or prism pillars arranged continuously or non-continuously, wherein in this embodiment continuously arranged prism stripes 312 are taken as an example, but not limited thereto. In addition, the angle θ3 of every first prism 312 may be substantially between 20 degrees and 43 degrees.

The sensing device 320 is disposed under the first prism film 310, wherein the sensing device 320 is adapted to receive an object beam L2 passing through the first prism film 310 and the first lens 330 in order, as shown in FIGS. 5 and 6. In this embodiment, the sensing device 320 may be implemented by the complementary metal-oxide-semiconductor (CMOS) image sensor or charge-coupled device (CCD) image sensor, wherein a CMOS image sensor is taken as an example in this embodiment, but not limited thereto. Specifically speaking, the optical sensing module 300 of this embodiment may include a light source 340, wherein the light source 340 is adapted to provide a radiation beam L1 emergent from the optical sensing module 300. In this manner, when the radiation beam L1 transmits to an object 1005, the object 1005 is adapted to reflect the radiation beam L1 to become the object beam L2. In this embodiment, the object 1005 is exemplarily illustrated by the user's hand or other hand-held objects, but not limited thereto. In addition, the light source 340 may be implemented by invisible light sources, e.g. the infrared light source or UV light source, wherein an infrared light source is taken as an example herein, but not limited thereto. It should be mentioned that in order to be able to detect the object beam L2, the sensing device 320 may select the image sensor for sensing invisible light, e.g. the infrared image sensor.

Referring to FIGS. 5 and 6 continuously, similarly in order to overcome the problem mentioned in the prior art, the optical sensing module 300 of this embodiment may refract the object beam L2 coming from the front of a display surface 1120 of the display device 1100 of an electronic apparatus 1000 by the aforementioned first prism film 310 to inside the optical sensing module 300. That is, the optical sensing module 300 of this embodiment may change the entire light collecting direction by disposing the first prism film 310 so that incoming light from a predetermined direction may be collected as much as possible thereby having a better sensing performance without increasing the total thickness H22 of the optical sensing module 300. Specifically speaking, the angle θ3 of every first prism 312 may be substantially between 20 degrees and 43 degrees, wherein when the aforementioned angle θ3 is smaller than 20 degrees, the object beam L2 is over-refracted by the first prism 312 to deviate from the position of the sensing device 320, i.e. the object beam L2 not being able to effectively impinge onto the sensing device 320; similarly, when the aforementioned angle θ3 is larger than 43 degrees, the object beam L2 is under-refracted by the first prism 312 and can not effectively impinge onto the sensing device 320. In one preferred embodiment, the angle θ3 of every first prism 312 may be substantially between 32 degrees and 34 degrees. In this embodiment, the lens 330 is disposed between the first prism film 310 and the sensing device 320 and configured to image the object beam refracted by the first prism film 310 onto the sensing device 320. It should be mentioned that the first lens 330 may optionally use the design in the aforementioned optical sensing module 200.

In addition, the optical sensing module 300 may further include a housing 350, wherein the housing 350 has a bottom surface 352 and a light incident surface 354 opposite to the bottom surface 352, as shown in FIG. 6. In this embodiment, the sensing device 320 and the first lens 330 are located inside the housing 350, and the sensing device 320 is disposed on the bottom surface 352. The first lens 330 is located between the sensing device 320 and the light incident surface 354, wherein the light incident surface 354 may have a light incident hole 354a for receiving the object beam L2 reflected by the object 1005.

In this embodiment, the aforementioned light source 340 may also be disposed inside the housing 350 and on the bottom surface 352, wherein the housing 350 has a light emergent surface 356 opposite to the bottom surface 352 and adjacent to the light incident surface 354 such that the radiation beam L1 provided by the light source 340 may emerge from the optical sensing module 300 via the light emergent hole 356a of the light emergent surface 356. In addition, due to the optical design of the prism film 310 of the optical sensing module 300 mentioned above, the sensing range of the optical sensing module 300 may be closer to the right direction of FIG. 5 than that of the traditional optical sensing module 1200, as shown in FIG. 1, without increasing too much thickness. Therefore, in order to allow the radiation beam L1 to also illuminate the same sensing range, the optical sensing module 300 of this embodiment may further include a second prism film 360, wherein the second prism film 360 includes a plurality of second prisms 362. In this manner, when the radiation beam L1 from the light source 340 sequentially passes through a second lens 370 and the second prism film 360 and emerges from the optical sensing module 300, the radiation beam L1 may be closer to the front of the display surface or the right direction of FIG. 5 as aforementioned sensing range. In should be mentioned that besides the separated arrangement of the first prism film 310 and the second prism film 360 shown in FIG. 6, in one embodiment the first prism film 310 and the second prism film 360 may be integrally formed, i.e. one prism film may be directly disposed to replace both the first prism film 310 and the second prism film 360.

In other embodiments not shown herein, the second lens 250 of the aforementioned optical sensing module 200 may not be deviated. The design of deviating the second lens 250 may be replaced by incorporating the aforementioned second prism film 360 above the second lens 250. Similarly, a second prism film 360 may not be disposed above the second lens 370 of the optical sensing module 300 but the second lens 370 has a deviation.

As mentioned above, the optical sensing module according to an embodiment of the present disclosure has at least the following advantages. Firstly, a sensing range of the optical sensing module is changed by deviating the lens such that when the optical sensing module is applied to an electronic apparatus, the optical sensing module may still have a better sensing performance without increasing the thickness of the electronic apparatus. In addition, a sensing range of the optical sensing module is also changed according to the optical design of the prism film such that when the optical sensing module is applied to an electronic apparatus, the optical sensing module may still have a better sensing performance without increasing the thickness of the electronic apparatus.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical sensing module, comprising:
   a light source adapted to provide a radiation beam emergent from the optical sensing module;
   a sensing device disposed with a displacement from the light source; and
   a first lens disposed above the sensing device, the first lens having an optical axis, the optical axis extending through a geometric center of the first lens and vertical to a plane on which the light source and the sensing device are disposed,
   wherein the optical axis of the first lens is offset from a geometric center of the sensing device along a direction perpendicular to a direction from the light source to the sensing device by a predetermined distance,
      wherein the sensing device is adapted to receive an object beam passing the first lens,
      the first lens has a light incident plane, a light emergent plane opposite to the light incident plane, and a connecting plane connecting the light incident plane and the light emergent plane, and an included angle between the connecting plane and the optical axis is larger than 0 degree and smaller than 75 degrees to reduce an area of the optical sensing module along the direction perpendicular to the direction from the light source to the sensing device.

2. The optical sensing module as claimed in claim 1, wherein the distance between the optical axis of the first lens and the geometric center of the sensing device is between 0.2 mm and 0.4 mm.

3. The optical sensing module as claimed in claim 1, wherein when the radiation beam transmits to an object, the object is adapted to reflect the radiation beam to become the object beam.

4. The optical sensing module as claimed in claim 1, further comprising:
a housing having a bottom surface and a light incident surface opposite to the bottom surface,
wherein the sensing device and the first lens are inside the housing, and the sensing device is disposed on the bottom surface, and the first lens is between the sensing device and the light incident surface.

5. The optical sensing module as claimed in claim 4, wherein the light incident surface has a light incident hole.

6. The optical sensing module as claimed in claim 4, wherein the light source is disposed inside the housing, and
when the radiation beam transmits to an object, the object is adapted to reflect the radiation beam to become the object beam.

7. The optical sensing module as claimed in claim 6, further comprising:
a prism film comprising a plurality of prisms each having an angle from 20 degrees to 43 degrees between a bottom edge and a bevel edge thereof,
wherein the radiation beam from the light source is adapted to sequentially pass through a second lens and the prism film and emerge from the optical sensing module, and the second lens is between the prism film and the light source.

8. The optical sensing module as claimed in claim 6, further comprising:
a second lens having an optical axis and disposed above the light source, and the optical axis of the second lens not passing through a geometric center of the light source, and the radiation beam from the light source being adapted to pass through the second lens and emerge from the optical sensing module.

9. The optical sensing module as claimed in claim 6, wherein the housing further has a light emergent surface opposite to the bottom surface and adjacent to the light incident surface, and the radiation beam is adapted to emerge from the optical sensing module via the light emergent surface.

10. The optical sensing module as claimed in claim 9, wherein the light emergent surface has a light emergent hole.

11. The optical sensing module as claimed in claim 1, wherein
the first lens has another connecting plane connecting the light incident plane and the light emergent plane,
the connecting plane does not overlap the sensing device in a direction vertical to the plane on which the light source and the sensing device are disposed, and
the another connecting plane overlaps the sensing device in the direction vertical to the plane on which the light source and the sensing device are disposed.

12. An optical sensing module, adapted for sensing an object for an electronic apparatus having a display device, the optical sensing module comprising:
a light source adapted to provide a radiation beam emergent from the optical sensing module;
a first lens having an optical axis, the optical axis extending through a geometric center of the first lens and vertical to a plane on which the light source is disposed; and
a sensing device displaced from the light source along a direction parallel to a side of the display device of the electronic apparatus and disposed under the first lens,
wherein the optical axis of the first lens is horizontally offset, along a direction perpendicular to the direction parallel to the side of the display device, from the sensing device towards the side of the display device of the electronic apparatus by a predetermined distance,
the sensing device is adapted to receive an object beam passing the first lens, and
the first lens has a light incident plane, a light emergent plane opposite to the light incident plane, and a connecting plane connecting the light incident plane and the light emergent plane, and an included angle between the connecting plane and the optical axis is larger than 0 degree and smaller than 75 degrees to reduce an area of the optical sensing module along the direction perpendicular to the direction parallel to the side of the display device.

13. An electronic apparatus, comprising:
a main body having a display device; and
an optical sensing module disposed inside the main body, the optical sensing module comprising:
a light source adapted to provide a radiation beam emergent from the optical sensing module;
a first lens having an optical axis, the optical axis extending through a geometric center of the first lens and vertical to a plane of the main body on which the light source is disposed; and
a sensing device disposed under the first lens and displaced from the light source along a direction parallel to a side of the display device of the electronic apparatus,
wherein the optical axis of the first lens is horizontally offset, along a direction perpendicular to the direction parallel to the side of the display device, from the sensing device towards the side of the display device of the electronic apparatus by a predetermined distance,
the sensing device is adapted to receive an object beam passing the first lens, and
the first lens has a light incident plane, a light emergent plane opposite to the light incident plane, and a connecting plane connecting the light incident plane and the light emergent plane, and an included angle between the connecting plane and the optical axis is larger than 0 degree and smaller than 75 degrees to reduce an area of the optical sensing module along the direction perpendicular to the direction parallel to the side of the display device.

* * * * *